Aug. 19, 1924.
T. L. VALERIUS
1,505,755
APPARATUS FOR DETERMINING THE MOISTURE CONTENT OF BUTTER AND THE LIKE
Filed Nov. 23, 1921  2 Sheets-Sheet 1
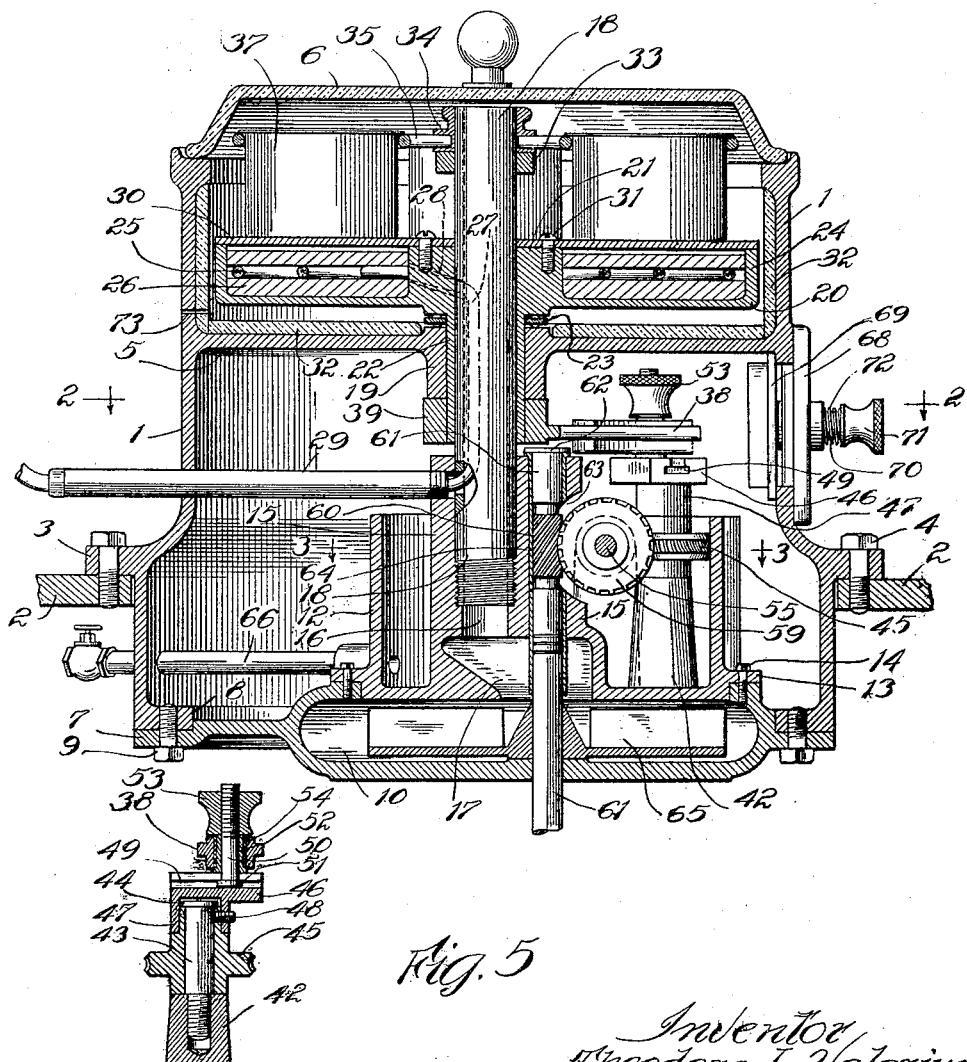

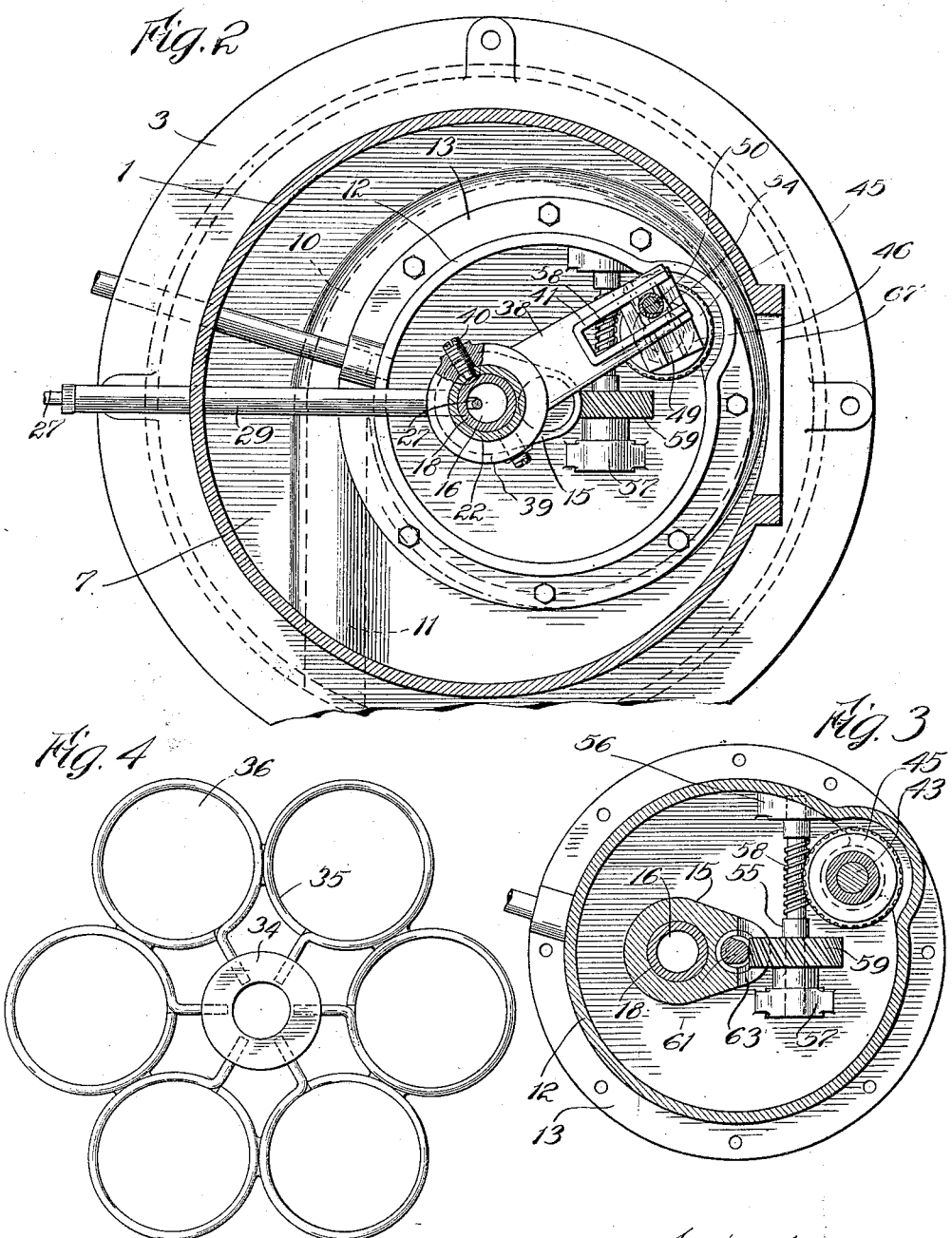

Patented Aug. 19, 1924.

1,505,755

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

APPARATUS FOR DETERMINING THE MOISTURE CONTENT OF BUTTER AND THE LIKE.

Application filed November 23, 1921. Serial No. 517,195.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Apparatus for Determining the Moisture Content of Butter and the like, of which the following is a specification.

The invention relates to devices for testing the moisture content of butter and like substances, and more particularly to a device in which samples of butter are heat treated in a partial vacuum to evaporate the moisture therefrom.

In the commercial manufacture of butter, an accurate determination of the proportionate amount of moisture in the butter is essential to uniformity of product, and also for compliance with laws limiting a permissible amount of moisture. Tests for determining the percentage of moisture are made in connection with the churning and working operations, and it is obviously desirable that such tests consume the least possible amount of time and give accurate results. Similar tests are frequently made also in connection with the marketing of butter.

It is customary to take samples of the butter in small test quantities, and heat the samples in suitable containers to drive off the moisture by evaporation, the sample being weighed before and after the moisture has been evaporated.

The container carrying the sample to be thus heated is ordinarily placed in an oven or over a flame or hot plate, the containers being stationarily positioned during the heating process.

A difficulty heretofore attending such tests has been the tendency of the still sample of butter to burn in that portion contacting the container walls, and also to "sputter" when liquefied, throwing portions of the sample out of the container. Such occurrences destroy the accuracy of the test, in that burning the sample chars a portion of the solid contents, drives off some of the oil content, and renders the resultant dry weight unreliable. A still sample being heated also forms a dense surface layer or crust which prevents the escape of moisture vapor from the body of the sample until sufficient heat is applied also to drive off some of the more volatile oils, cause sputtering, and endanger burning the sample, further results which prevent accurate calculation of moisture based on the dry weight. Avoidance of these difficulties have required great care and an excessive period of time in making the tests in such stationary containers.

The general object of this invention, therefore, is to provide an apparatus by means of which the butter samples may be heated and the moisture evaporated therefrom and carried away without material loss or charring of the other constituents of the samples, permitting calculation of the dry weight with great accuracy.

I attain this object by providing an oscillating hot plate, operating in an enclosed chamber in which a partial vacuum is maintained, the hot plate being controllably heated to the desired degree, and adapted to receive a number of sample containers which oscillate with the plate, thereby agitating their contents sufficiently to prevent the formation of a surface crust or burning of the sample, and facilitating the escape of the vaporized moisture which is carried away by an induced current of rarefied air.

Another object is to provide simple durable mechanism for imparting oscillatory motion to the hot plate, and for partially exhausting the air from the heating chamber.

Other objects and advantages will be apparent in the following description of a preferred embodiment of my invention which I have illustrated in the accompanying drawings. It will be understood, however, that in the interpretation of the appended claims they are not to be limited to the precise construction and arrangement set forth, except as may be necessitated by the state of the prior art.

In the accompanying drawings, Fig. 1 is a sectional elevation of the device.

Fig. 2 is a sectional plan view taken on the plane of the line 2—2 in Fig. 1.

Fig. 3 is a sectional plan view taken on the plane of the line 3—3 in Fig. 1.

Fig. 4 is a detail view of a container retaining frame.

Fig. 5 is a detail view of a part of the actuating mechanism.

Referring to the drawings, the numeral 1 indicates a casing forming a housing for the hot plate, and the operating and vacuum producing mechanism. The casing is constructed to be supported upon an appropriate frame or table 2 through which the casing may extend and to which it may be secured by means of a lateral flange 3 overlying the edge of the table opening and fastened thereto by screws 4.

A horizontal partition 5 divides the casing into an upper heating chamber and a lower chamber containing the mechanism. The upper chamber is adapted to accommodate the oscillating hot plate and the butter sample containers being heated thereon, and is closed by a removable cover 6 seated upon the side walls of the casing with a sufficiently tight fit to support a partial vacuum within the chamber when closed.

The lower end of the casing supports a removable bottom wall 7 secured to an inner flange 8, formed on the casing side walls, by cap screws 9. The wall 7 is constructed to form in its structure a chamber 10 in position eccentric to the center of the casing and of suitable lateral contour to serve as the operating chamber for an exhauster rotor, the chamber being provided with a tangential discharge passage 11 opening outwardly of the casing.

As formed in the wall 7, the chamber 10 is open on its upper side, the opening being adapted to receive a cylindrical shell 12 having a base forming the upper wall of the chamber 10, and having a lateral flange 13 suitably secured to the exhauster case portion of the bottom wall, as by cap screws 14.

Rising from the base within the shell 12 is an upright support 15 having a vertical passage 16 concentric with the axis of the casing 1. The passage 16 opens at its lower end into a pocket 17 in the base of the shell, the pocket opening into the chamber 10 concentrically with the rotor axis of the latter chamber.

Rigidly mounted within the passage 16 in the support 15 is an upright tubular element 18 extending through the partition 5 and the upper chamber of the casing 1, the open upper end of the tube 18 terminating at the upper side of the upper chamber.

The partition 5 carries a central hub 19 having an axial bore through which passes the tube 18, there being a substantial annular space between the tube and the hub.

Located in the upper chamber of the casing is a hot plate 20 having also a hub portion 21 surrounding the tube 18 and having a free rotative bearing thereupon. An integral sleeve 22 extends downwardly from the hub 21 between the tube 18 and the partition hub 19, and below the latter for a substantial distance, the sleeve being freely operable therebetween. The hot plate is spaced from the side walls of the casing and from the partition 5, and is operatively supported upon the partition, preferably upon anti-friction bearings 23 interposed between the opposed end bearing surfaces of the hubs 19 and 21 respectively.

As illustrated herein, the hot plate 20 is shaped with an upturned peripheral flange 24 forming with the upper end of the hub 21 an annular recess in which is disposed a suitable electric heating element 25 secured and supported by an appropriate filling compound 26.

Flexible conductors 27 lead from the terminals of the heating element through a passage 28 in the hub 21, enter the tube 18 through a registering slot, thence down and out through openings in the tube 18 and support 15 to a conduit 29 extending outwardly of the casing wall, from whence the conductors lead to a suitable source of electric current.

The relative movement of the hot plate about the tube 18 being oscillatory through a short arc, the slot in the tube registering with the passage 28 need be but of short circumferential length to permit the necessary swing therein of the conductors 27.

The upper face of the hot plate 20 is provided with a flat metallic plate 30 covering the heating element and secured to the hub 21 as by screws 31. Suitable heat insulating material 32 may be secured to the upper surface of the partition 5 and to the inner surface of the casing wall, to retain the heat generated in the hot plate and maintain uniform temperature in the heating chamber.

Near the upper end of the tube 18 is preferably secured a collar 33 forming a bearing support for a ring 34 rotatably mounted on the tube and carrying a skeleton frame 35 providing a series of radially disposed openings 36 for the reception of butter sample containers 37 resting upon the upper surface of the hot plate. The containers 37 are laterally supported by the frame and preferably are provided with outwardly flared upper edges overlying the surrounding portions of the frame, so that with the removal of the latter from the end of the tube 18 the hot containers may be lifted from the hot plate and removed from the heating chamber.

The hot plate 20 is arranged to be oscillated in a short arc about the tube 18 by means of mechanism housed in the lower chamber of the casing. Mounted on the lower end of the sleeve 22 adjacent the hub 19 is a shaker arm 38 having a strap portion 39 removably secured to the sleeve by means of screw studs 40. The free end of the rocker arm is thickened and longitudinally slotted to provide a slideway 41.

Rising from the base of the shell 12 and laterally spaced from the support 15 is another upright support 42, the top of which (see Fig. 5) is bored and threaded to receive a vertical pivot stud 43 having a retaining head 44.

A spiral toothed gear 45 is rotatably mounted on the pivot stud, and carries a crank arm 46 having a collar 47 at one end extending over the end of the pivot stud and a portion of the spiral gear hub, the collar being secured to the latter by a set screw 48.

An inverted T-shaped longitudinal slot 49 preferably is formed in the upper surface of the crank arm, and is adapted to receive a crank stud 50 having a flanged head 51 slidable in the lateral recesses of the slot. An annular bushing 52 is mounted on the crank stud, serving as a spacer between the crank arm and a knurled nut 53 threaded on the upper end of the crank stud. The crank stud may be adjusted to any desired distance from the axis of the crank arm by sliding its head through the slot 49, and may be secured in adjusted position by tightening the nut 53 upon the spacer bushing.

Rotatably mounted on the annular bushing 52 is a slide block 54 adapted to be operatively engaged within the slideway 41 in the shaker arm 38.

By this construction it will readily be seen that revolution of the gear 45 will impart an oscillatory motion to the shaker arm 38, and thereby through the sleeve 22 to the hot plate 20 and the containers being heated thereon. The range of the oscillatory swing may be adjusted by adjusting the crank stud 50 in relation to its center of rotation.

For the operation of the spiral gear 45 there is provided a horizontal shaft 55, journaled at its ends in a pair of bearing standards 56 and 57 rising from the base of the shell 12, and having its worm threaded mid portion 58 in driving engagement with the gear 45. The shaft 55 also carries a spiral toothed gear 59 rigidly mounted thereon.

Laterally spaced from the passage 16 in the support 15 is a vertical bore in which preferably is fitted a bearing sleeve 60 having a flanged upper end overlying the top of the support 15 and extending downward into the pocket 17. A vertical drive shaft 61 is journaled in the bearing sleeve, and also has a flanged head 62 at its upper end which bears upon the flanged end of the bearing sleeve. The support 15 and sleeve 60 are laterally cut away, as at 63, to expose a portion of the shaft 61 having worm threads 64 cut therein and meshing in driving engagement with the gear 59.

The drive shaft 61 extends downwardly through the exhauster chamber 10 and the lower casing wall 7 for connection with suitable driving means such as an electric motor (not shown).

Within the chamber 10 the shaft 61 carries a centrifugal exhauster rotor 65 adapted to expel the air from the chamber 10 through the exhaust passage 11.

If desired, an oil bath for the lubrication of the mechanism operating within the shell 12 may be maintained in the well formed by the walls of the shell, and an oil draw-off pipe 66 provided to draw off the used oil preliminary to renewing the supply.

To give convenient access to the adjustable parts of the mechanism, an opening 67 may be provided in the side wall of the casing 1, the marginal edges of the casing wall being carried outward to form a plane seat for a cover 68 secured thereto by a turn bar 69 fixed on the inner end of a bolt 70 extending through the cover and terminating in a knurled knob 71. A spring 72 may be interposed between the cover and the knob to assure a tight contact of the cover on its seat.

In operation, the samples of butter or similar substances are placed in the containers 37 and carefully weighed, after which the containers are severally placed in the openings provided in the supporting frame 35 and positioned in the upper chamber of the casing with their bottoms upon the hot plate. The cover 6 is then placed in position, forming an enclosed heating chamber. Electric current is then supplied to the heating element in the hot plate, and the motor or other driving means started.

With the rotor 65 in operation, the air in the heating chamber is partially exhausted by expansion through the tube 18 and passages 16 and 17 into the exhauster chamber 10, and thence expelled by the rotor through the passage 11. The lowered pressure facilitates the evaporation of moisture from the heated samples.

It is desirable also to maintain a slight current of air over the containers to carry away the evaporated moisture. This is accomplished in part by leakage of air into the chamber between the cover and the casing wall, and may be supplemented by small ducts 73 opening through the side walls of the casing.

The oscillation of the hot plate and the containers supported thereupon keeps the melted samples in continual motion and thereby prevents the forming of a surface crust, or the driving off or charring of other constituents of the samples while the moisture is being evaporated.

After the moisture has been expelled, the samples are removed from the hot plate with the supporting frame, and are preferably placed in a suitable enclosed desiccator to cool without again absorbing moisture from the atmosphere. After cooling, the samples are again weighed, the difference between the weights before and after evaporation being in each case the weight of the moisture originally contained in the sample.

It will now be apparent that I have provided an effective durable apparatus for the accurate determination of the moisture content of substances tested therein and for the completion of the tests within a short space of time.

I claim as my invention:

1. In apparatus of the class described, the combination of a casing having a vacuum chamber, a movable hot plate mounted in said chamber, means for heating the hot plate, and mechanism for causing said hot plate to vibrate.

2. In apparatus of the class described, the combination of a casing having a chamber, a removable closure for the chamber, a pivoted hot plate mounted in said chamber, means for partially exhausting the air from said chamber, and mechanism for causing said hot plate to oscillate about its pivot.

3. In a device of the class described, the combination of a casing having a substantially enclosed heating chamber, a pivoted hot plate in said heating chamber, housing for a rotary air exhauster, an enclosed passage between said chamber and said housing, a rotor in said housing operable to partially exhaust said chamber, a driven shaft operating said rotor, and an operating connection between said shaft and said hot plate to impart oscillatory motion to said hot plate.

4. In a device of the class described, in combination, a casing, a partition forming a chamber in said casing and having a central aperture, a removable closure for said chamber, a tubular support in said chamber extending outwardly through said aperture in spaced relation to the margins thereof, a hot plate in said chamber rotatable about said tubular support, a sleeve encircling said tubular support in rigid relation to said hot plate, said sleeve extending outwardly through said aperture and effecting a closure thereof about said support, means associated with said tubular support for partially exhausting therethrough the air from said chamber, and mechanism connected with said sleeve for oscillating said hot plate.

5. In a device of the class described, in combination, a casing having an upper chamber and a lower chamber, a partition wall between said chambers having an aperture, a removable cover for said upper chamber, a closure for said lower chamber having a portion forming air exhauster chamber, a tubular support mounted on said closure and extending through said aperture into said upper chamber, said tubular support establishing communication between said exhauster chamber and said upper chamber, an oscillatory hot plate in said upper chamber, a sleeve on said tubular support operable to actuate said hot plate, said sleeve extending through said aperture into said lower chamber, an arm rigidly mounted on said sleeve, a rotor in said exhauster chamber, an operating shaft for said rotor, and a crank operatively connected with said shaft adapted to oscillate said arm.

6. In a device of the class described, in combination, a casing having an upper chamber, a pivoted hot plate in said chamber, an exhauster chamber in the base of said casing communicating with said upper chamber, a rotor in said exhauster chamber, a vertical support mounted on a wall of said exhauster chamber having a bearing alined with the axis of said rotor, a driven shaft operating said rotor and journaled in said bearing, said shaft having a worm threaded section within said bearing exposed by a lateral recess in said support, and gear means driven thereby having a connection operable to oscillate said pivoted hot plate.

7. In a device of the class described, in combination, a hot plate having a recess, an electric heating element disposed in said recess, a tubular bearing support for said hot plate about which said hot plate is caused to oscillate, said tubular support and said hot plate respectively having passages constantly in register during the oscillation of said plate and forming a passage from said recess to the interior of said tubular support, and conductors in said passage connecting with said electric heating element.

In testimony whereof I have hereunto set my hand.

THEODORE L. VALERIUS.